United States Patent
Porsche et al.

[15] 3,635,497
[45] Jan. 18, 1972

[54] STEERING RUNNER OF A ONE-TRACK SLIDING VEHICLE

[72] Inventors: Ferdinand Alexander Porsche, Doffingen; Theodor Bauer, Leinfelden, both of Germany

[73] Assignee: Firma Dr.-Ing. h.c.F. Porsche KG, Stuttgart-Zuffenhausen, Germany

[22] Filed: Sept. 9, 1969

[21] Appl. No.: 856,319

[52] U.S. Cl. ............................................................ 280/16
[51] Int. Cl. ..................................................... B62b 13/04
[58] Field of Search ........................... 280/15, 16, 25, 9, 17

[56] References Cited

UNITED STATES PATENTS 1,907,321  5/1933  Hilstrom ................................. 280/9

3,425,707  2/1969  Horiuchi et al. ......................... 280/16

FOREIGN PATENTS OR APPLICATIONS 646,149  9/1962  Italy ........................................ 280/17

*Primary Examiner*—Benjamin Hersh
*Assistant Examiner*—Winston H. Douglas
*Attorney*—Craig, Antonelli & Hill

[57] ABSTRACT

A one-track sliding vehicle or sled having a supporting frame, a steering mechanism rotatably mounted at the supporting frame and a front steering runner and a rear runner connected at said supporting frame. The front steering runner is supported at the steering mechanism or at the supporting frame itself by a spring or shock-absorber leg which is adjustably mounted, thereby allowing the steering runner to be optimally adjusted to the particular driving conditions such as, for example, deep snow

24 Claims, 6 Drawing Figures

STEERING RUNNER OF A ONE-TRACK SLIDING VEHICLE

BACKGROUND OF THE INVENTION

The present invention relates to a one-track sliding vehicle or sled, and more particularly, to a one-track sliding vehicle having a supporting frame to which are mounted a rear sliding runner and, by means of a steering mechanism, a front steering runner. The steering runner is supported with respect to the steering mechanism or the supporting frame by means of a spring or shock-absorbing leg containing a spring and a shock-absorbing damper.

The main requirement which is to be met by such sliding vehicles is that they be capable of being securely steered in all snow terrain conditions of a large variety of the types which are encountered during driving. In the known sliding vehicles of the aforementioned type, the spring legs are fixedly mounted to the steering runner and the steering column. Thus, no provision is made for varying the basic orientation of the steering runner with respect to the track.

SUMMARY OF THE INVENTION

Accordingly, it is the object of the present invention to improve the steerability and the driving properties of a one-track sliding vehicle or sled, and in particular, to optimally adjust the sliding vehicles which are employed in sports events in accordance with the particular type of contest and with the respective driver through the adjustment of the basic position or orientation of the steering runner with respect to the sliding runner.

This problem is solved, in accordance with the present invention, by providing that the mounting of the spring or shock-absorbing leg to the front runner and/or to the steering mechanism or the supporting frame, respectively, is designed so as to be adjustable. The bearing for the spring or shock-absorbing leg is attached to the steering mechanism and the steering runner, respectively, so as to be adjustable totally as a unit. Detents or indentations are provided at the steering mechanism and at the steering runner for fixing the position of the bearing. For this purpose, the steering column of the steering mechanism and the runner are each provided with indentations or detents cooperating with a lock member in order to fixedly secure the adjustable bearing in its position.

The bearing for the spring or shock-absorbing leg can also consist of two parts which are constructed so as to be displaceable with respect to each other. In this connection, the bearing parts have interlocking sections, one of the bearing parts having indentations or detents with which a lock member of the other bearing part cooperates. The bearing part which is provided with the indentations or detents is, for example, fixedly attached to the steering runner, and the bearing part which is provided with the lock member includes a readily releasable latch for receivably holding the spring or shock-absorbing leg.

The advantages of the present invention reside, in particular, in the fact that the steering runner can be readily adjusted with respect to the track, so that no problems arise in, for example, the steerability of the sliding vehicle when traveling from a terrain having a thin cover snow to a zone having deep snow. Thus, the sliding vehicle can easily be employed in various types of sports events. The bearings of the spring or shock-absorbing leg at the steering column as well as at the steering runner are constructed so as to be rugged and readily adjustable. The clamping or readily releasable lock makes possible the easy and quick release of the spring or shock-absorbing leg.

BRIEF DESCRIPTION OF THE DRAWINGS

These and further objects, features and advantages of the present invention will become more apparent from the following description when taken in connection with the accompanying drawings which show, for purposes of illustration only, an embodiment in accordance with the present invention, and wherein.

DETAILED DESCRIPTION OF THE DRAWINGS

Figure 1:
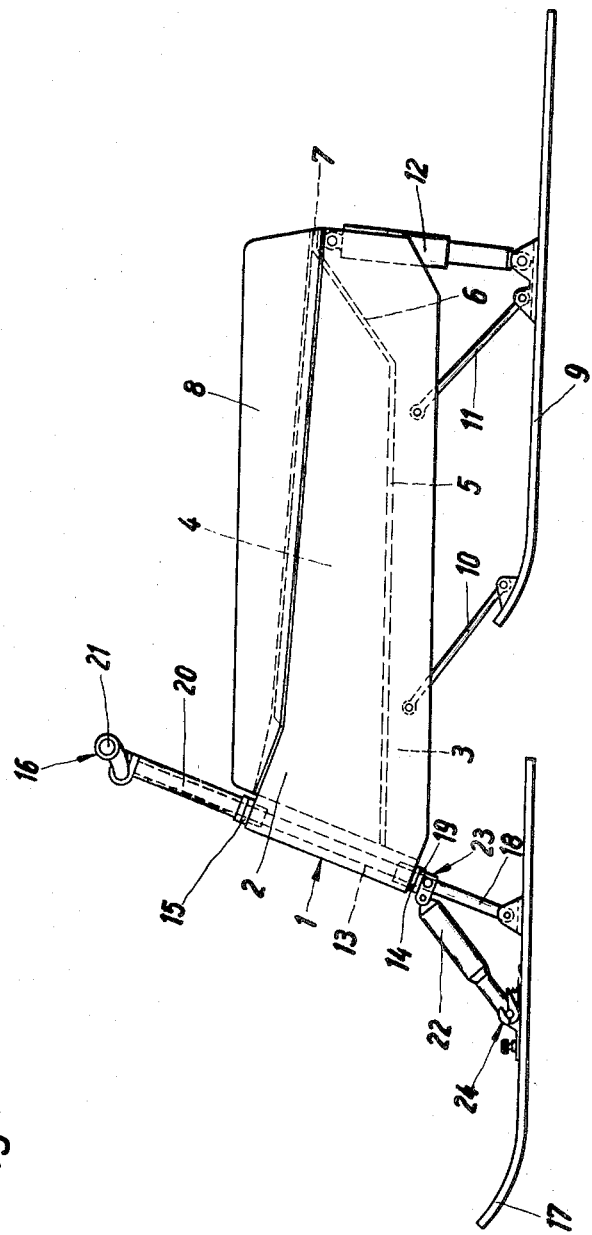
FIG. 1 is a lateral or elevational view of a sliding vehicle according to the present invention.

With reference now to the drawings and, in particular, to FIG. 1, the sliding vehicle 1 comprises a supporting frame or body 2 made of a suitable plastic material and formed as a structurally rigid hollow body. Cavities 3, 4 are provided in the supporting frame 2 and are defined by partitions or intermediate walls 5, 6, 7. An upholstered seat 8 is disposed in the upper zone of the supporting frame 2 and is constructed as a hinged lid or cover and closes off the cavity 4. On the side of the supporting frame 2 opposite the seat 8, that is, the lower zone, a rear sliding runner 9 is hingedly attached by guide means 10, 11. The rear sliding runner is cushioned by a conventional spring or shock-absorbing leg 12. In addition, a supporting tube 13, which has bearing bushings 14, 15 on both ends thereof, is provided in the front or forward zone of the supporting frame 2. The supporting tube 13 is connected with the supporting frame 2 and serves to receive a steering mechanism designated generally by the numeral 16. The steering mechanism 16 comprises a steering column 18 provided with a steering runner 17 held in its position by a stop or abutment member 19 and a sleeve 20. The stop or abutment member 19 and the sleeve 20 of the steering mechanism 16 rest on the bearing bushings 14, 15 of the supporting tube 13. A steering device such as, for example, a handlebar 21 is provided at the free end of the sleeve 20 of the steering mechanism 16. The steering runner 17 of the steering mechanism 16 is supported on a further spring or shock-absorbing leg 22 hingedly connected to the steering runner 17 and the steering column 18 by adjustable bearing means 23, 24. The adjustable bearing means 23 for the spring or shock-absorbing leg 22 can also be provided, for example, at the supporting frame 2 of the sliding vehicle 1.

Figure 2:
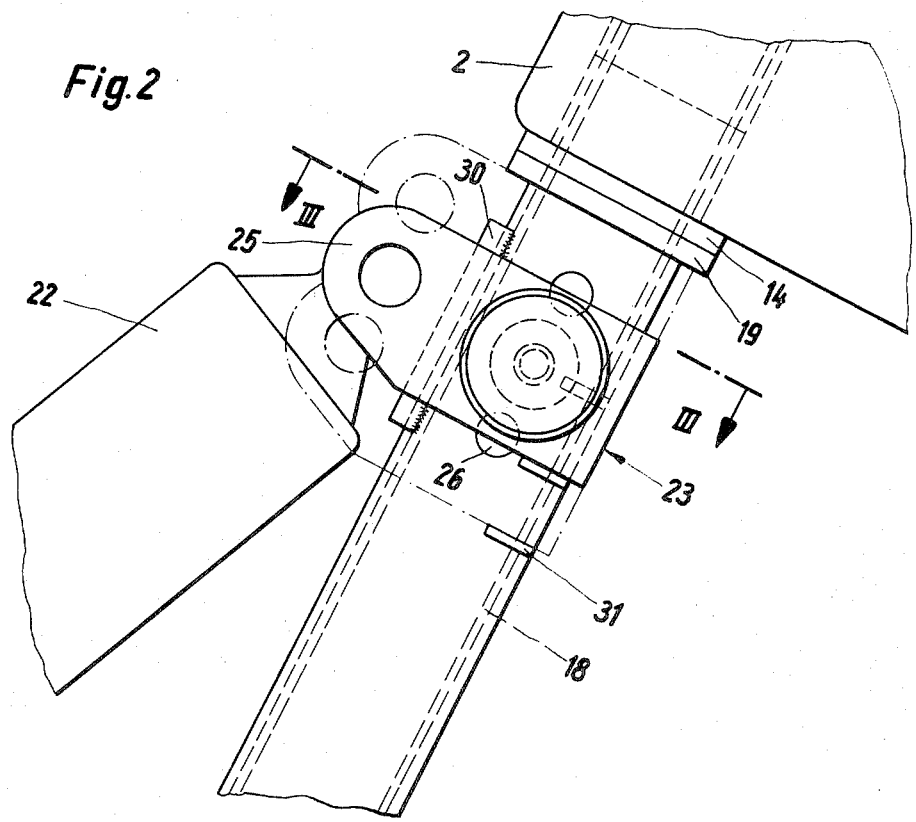
FIG. 2 is a fragmentary view of the sliding vehicle with an adjustable spring or shock-absorbing leg mounting on an enlarged scale.
Figure 3:
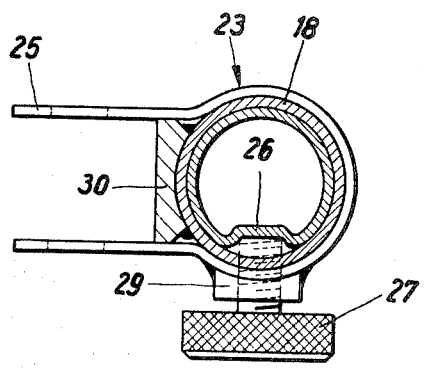
FIG. 3 is a sectional view along line III—III of FIG. 2.

In FIG. 2, one possible design of the bearing means 23 at the steering column 18 is illustrated. The bearing means has a part 25 to which the shock-absorbing member 22 is hingedly connected. In accordance with FIG. 3, the bearing means 23 surrounds the steering column 18 of the steering mechanism 16 in the manner of a tube clip or sleeve joint. For the adjustment of the bearing means 23, indentations or detents 26 are provided on the steering column 18 which cooperate with a knurled-head screw 27 disposed in a boss 29 having a threaded bore 28. The boss 29 is connected with the steering column 18 by conventional means such as welding or the like and extends, with one surface, substantially parallel with respect to a longitudinal side of the sliding vehicle 1. Furthermore, the bearing 23 is secured against being twisted or rotated, and to this end, there is provided a guide member 30 on the steering column 18 which cooperates with the parts 25 of the bearing means 23. Markings or indicia 31 are provided on the steering column 18 so that the knurled-head screw 27 can be accurately positioned for cooperation with the respective indentations or detents when the bearing means 23 is to be adjusted.

Figure 4:
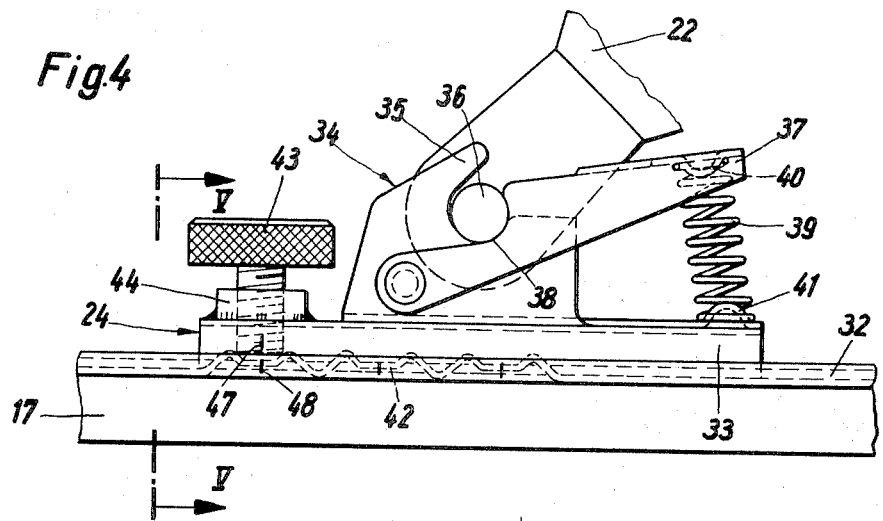
FIG. 4 is a fragmentary view of a steering runner with an adjustable mounting for the spring or shock-absorbing leg.

As seen in FIG. 4, the bearing means 24 at the steering runner 17 includes a lower rail part 32 and an upper rail part 33. The upper rail part 33 is provided with a readily releasable clamping lock or turnbuckle 34 at which the spring or shock-absorbing leg 22 is releasably mounted. The clamping lock 34 comprises a locking part 35 for receivably holding a bolt or pin 36 fixedly connected with the spring or shock-absorbing leg 22. A pawl 37 is pivotably attached to the locating part 35.

The pawl is provided with a section 38 which surrounds the bolt or pin 36 of the spring or shock-absorbing leg 22 and can be operated against the force of a compression spring 39. The compression spring 39 is held in its position by projecting portions or bulges 40, 41 provided at the upper rail part 33 and at the pawl 37, respectively.

Figure 5:
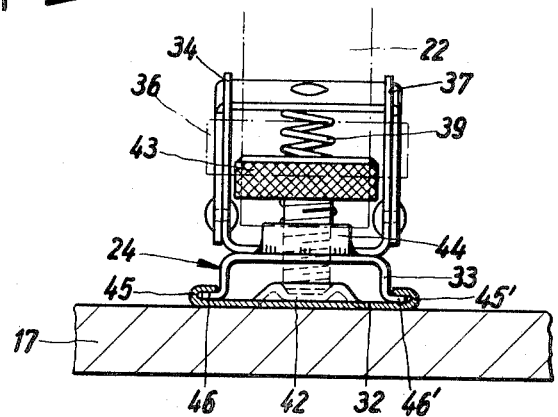
FIG. 5 is a sectional view along line V—V of FIG. 4.

The lower rail part 32 is provided with indentations or detents 42 cooperating with a setscrew 43. The setscrew 43 is mounted in a boss means 44 which can take the form of a conventionally welded nut provided at the upper rail part 33. The rail parts 32, 33 of the bearing 24, as seen in FIG. 5, are provided with interlocking sections 45, 46, 45′, 46′ which thereby ensure a flawless longitudinal displaceability of the upper rail part 33. Further, the rail parts 32, 33 are provided with markings or indicia 47, 48 so that the setscrew 43 is accurately positioned so as to be in alignment with the respective detents or indentations 42 when the bearing means 24 is adjusted.

Figure 6:
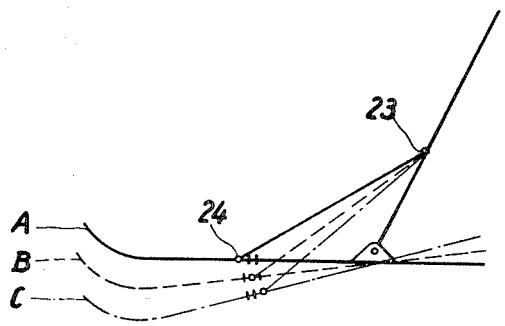
FIG. 6 is a schematic representation of the adjustment stages or positions of the steering runner.

In accordance with FIG. 6, the steering runner 17 can be placed into three different positions designated as A, B and C due to the adjustability of the bearing means 24. Similar relationships result when the bearing means 23 is adjusted. Finally, by adjusting both the bearing means 23, 24 simultaneously, a plurality of positions of the spring or shock-absorbing leg can be achieved, so that even without an infinitely variable adjustability an extensively optimum alignment of the steering runner can be effected. However, it is also possible to provide infinitely variable devices for the adjustment of the steering runner 17.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the invention.

We claim:

1. A one-track sliding vehicle including a supporting frame, a front steering runner, a rear runner and a steering mechanism being operatively associated with said supporting frame, wherein the improvement essentially comprises mounting means for adjustably mounting said front steering runner with respect to said supporting frame, wherein said mounting means includes a first connection between the steering runner and one end of a spring-biased shock-absorbing leg means, the other end of said leg means being connected by a second connection to the steering mechanism adjacent the supporting frame, said first connection being linearly adjustable with respect to the steering runner and said second connection being linearly adjustable with respect to the steering mechanism.

2. A one-track sliding vehicle according to claim 1, wherein said adjustable mounting means includes bearing means for said leg means, whereby said leg means is adapted to be adjustable totally as a unit.

3. A one-track sliding vehicle according to claim 2, further including detent means being provided on said sliding vehicle for fixing the location of said bearing means.

4. A one-track sliding vehicle according to claim 3, wherein said detent means is provided at said steering mechanism and at said front steering runner.

5. A one-track sliding vehicle according to claim 4, wherein said leg means includes a spring and a shock-absorbing damper.

6. A one-track sliding vehicle according to claim 3, further including locking means associated with said detent means for selectively fixing the location of said bearing means.

7. A one-track sliding vehicle according to claim 1, further including bearing means for said leg means being located at said front steering runner, said bearing means consisting of a plurality of parts which are displaceable with respect to each other.

8. A one-track sliding vehicle according to claim 7, wherein said leg means includes a spring and a shock-absorbing damper.

9. A one-track sliding vehicle according to claim 1, wherein said first and second connections are pivotable connections.

10. A one-track sliding vehicle according to claim 9, further including bearing means for said leg means being located at said front steering runner, said bearing means consisting of a plurality of parts which are displaceable with respect to each other.

11. A one-track sliding vehicle according to claim 10, wherein said parts are provided with interlocking portions, one of said parts being provided with detent means, and another of said parts being provided with locking means for cooperation with said detent means.

12. A one-track sliding vehicle according to claim 11, wherein said one part being provided with detent means is fixedly secured at said front steering runner.

13. A one-track sliding vehicle according to claim 12, wherein said part being provided with locking means further includes a readily releasable latch means for receivably mounting said leg means.

14. A one-track sliding vehicle according to claim 1, wherein a third connection is provided between the steering runner and the steering mechanism.

15. A one-track sliding vehicle according to claim 14, wherein said first, second and third connections are pivotable connections.

16. A one-track sliding vehicle having
a supporting frame consisting essentially of a rigid hollow body having hollow spaces therein accessible from the outside,
connecting wall means for mutually supporting the outer walls of said supporting frame,
a steering mechanism rotatably mounted at said supporting frame,
a front steering runner and a rear runner being operatively associated with said supporting frame,
a plurality of guide elements which are substantially parallel to each other being pivotably connected at said supporting frame and at said rear runner,
said front steering runner being pivotally articulated at said steering mechanism,
a spring element being attached to both said steering mechanism and said front steering runner, and
means for adjustably mounting said spring element at said steering mechanism and at said front steering runner to vary the angular orientation of the front steering runner with respect to the longitudinal axis of the supporting frame.

17. A one-track sliding vehicle according to claim 16, further including a bilaterally effective spring member being hingedly connected at said supporting frame and at said rear runner.

18. A one-track sliding vehicle according to claim 17, wherein a supporting tube is provided at the front portion of said supporting frame and extends substantially over the height thereof so as to receive said steering mechanism.

19. A one-track sliding vehicle according to claim 18, wherein bearing means is provided for said spring element at said steering mechanism and at said front steering runner.

20. A one-track sliding vehicle according to claim 19, wherein detent means is provided at said steering mechanism and at said front steering runner, respectively, for selectively securing said bearing means in a desired location.

21. A one-track sliding vehicle according to claim 20, wherein locking means is provided at said spring element for cooperation with said detent means for selectively securing said bearing means.

22. A one-track sliding vehicle according to claim 21, wherein said bearing means at said front steering runner consists of two members which are displaceable with respect to each other, said two members being provided with interlocking portions, one of said two members being provided with said detent means and the other of said two members being provided with said locking means for cooperation with said detent means.

23. A one-track sliding vehicle according to claim 22, wherein said one member provided with said detent means is fixedly mounted at said front steering runner, and said member being provided with said locking means is further provided with a readily releasable latch means for releasably securing said spring element.

24. A one-track sliding vehicle according to claim 23, wherein a pin means is fixedly associated with said spring element, said readily releasable latch means includes a locating part adapted to receive said pin means, a pawl pivotably connected to said locating part for surrounding said pin means, and a spring means for actuating said pawl.

* * * * *

UNITED STATES PATENT OFFICE
CERTIFICATE OF CORRECTION

Patent No. 3,635,497         Dated  January 18, 1972

Inventor(s)  Ferdinand Alexander Porsche and Theodor Bauer

It is certified that error appears in the above-identified patent and that said Letters Patent are hereby corrected as shown below:

Column 1, insert the following between lines 9 and 10:

"[32]    Priority         October 23, 1968
 [33]                     Germany
 [31]                     P 18 04 581.3  "

Signed and sealed this 22nd day of August 1972.

(SEAL)
Attest:

EDWARD M. FLETCHER, JR.                ROBERT GOTTSCHALK
Attesting Officer                       Commissioner of Patents